(12) United States Patent
Katahara et al.

(10) Patent No.: US 6,407,882 B1
(45) Date of Patent: Jun. 18, 2002

(54) STRUCTURE FOR SUPPRESSING VIBRATION OF SPINDLE MOTOR IN DISK DRIVE

(75) Inventors: Naotoshi Katahara, Kawasaki; Hiroshi Suzuki; Takahiro Ono, both of Yamagata, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/301,003

(22) Filed: Apr. 27, 1999

(30) Foreign Application Priority Data

Nov. 24, 1998 (JP) ............................. 10-332346

(51) Int. Cl.$^7$ .............................. G11B 17/02; H02K 5/24
(52) U.S. Cl. ................ 360/99.08; 360/98.07; 310/51
(58) Field of Search .................... 360/98.07, 99.08; 310/51

(56) References Cited

U.S. PATENT DOCUMENTS

| | | | | | |
|---|---|---|---|---|---|
| 4,965,476 | A | * | 10/1990 | Lin | 310/51 |
| 5,291,358 | A | | 3/1994 | Takahashi | 360/99.08 |
| 5,694,268 | A | * | 12/1997 | Dunfield et al. | 360/98.07 |
| 5,774,974 | A | * | 7/1998 | Dunfield et al. | 29/596 |
| 5,949,164 | A | * | 9/1999 | Cap et al. | 310/67 R |
| 5,949,613 | A | * | 9/1999 | Moir et al. | 360/99.08 |
| 5,986,365 | A | * | 11/1999 | Kuwert et al. | 310/51 |
| 6,104,114 | A | * | 8/2000 | Takeda et al. | 310/90 |
| 6,104,570 | A | * | 8/2000 | Pelstring | 360/98.07 |

FOREIGN PATENT DOCUMENTS

| | | |
|---|---|---|
| DE | 39 18953 | 12/1989 |
| DE | 197 41 977 | 3/1999 |
| EP | 597 188 | 5/1994 |
| EP | 0 856 845 | 8/1998 |
| JP | 7044990 | 2/1995 |
| WO | WO 96/36968 | 11/1996 |

* cited by examiner

Primary Examiner—Jefferson Evans
(74) Attorney, Agent, or Firm—Greer, Burns & Crain, Ltd.

(57) ABSTRACT

A spindle motor comprises a central axis fixed to a housing base. A core body is cantilevered by an annular member so as to support a coil of a stator. The coil is fixed to the housing base by an adhesion. The cantilevered core body is also supported by the housing base, so that the movement of the core body and coil is reliably restrained. The stator is prevented from vibrating during rotation of the rotor. Accordingly, reduction in the vibration of the spindle motor can be achieved.

17 Claims, 4 Drawing Sheets

STRUCTURE FOR SUPPRESSING VIBRATION OF SPINDLE MOTOR IN DISK DRIVE

BACKGROUND OF THE INVENTION

1. Field of the Invention

The present invention relates to a recording disk drive such as a hard disk drive unit (HDD), and in particular, to a recording disk drive comprising a spindle motor for driving a recording disk for rotation.

2. Description of the Prior Art

In general, a spindle motor assembled in the HDD comprises a stator fixed to the housing base of the HDD, and a rotor mounted around the central axis fixed to the housing base. The rotation of the rotor is generated by the mutual effect between the magnetic fields induced in the stator and rotor, respectively. The rotation of the rotor causes the rotation of recording disks mounted around the rotor.

The stator comprises an annular member which allows the inner surface to contact an annular wall raised from the housing base. A plurality of core bodies are integrally formed on the annular member so as to extend in the radial directions. Coils are wound around the respective core bodies so as to induce magnetic fields in the stator. The employment of such annular member is supposed to assist the respective coils to be positioned relative to the housing base. Rough positioning of the coils leads to an eccentricity between the annular arrangements of the coils and the permanent magnets in the rotor. This is not desirable.

The rotor is in general supported around the central axis via a pair of ball bearings fixed around the central axis at upper and lower positions, respectively. It is desirable to take a larger span between the upper and lower ball bearings along the central axis. A shorter span may cause the rotor to vibrate during rotation around the central axis. If reduction in thickness of the HDD is further expected, a larger span between the upper and lower ball bearings inevitably causes reduction in height of the annular wall which contacts the inner surface of the annular member.

Higher recording density to a recording disk is still expected in the field of recording disk drives. Improvement in recording density can be realized by reduction in track pitch on a recording disk. It is inevitable to reduce vibration of the rotating recording disk in reducing the track pitch, because the accuracy in positioning a transducer head gets deteriorated if the recording disk vibrates.

When the suppression in vibration is intended in a recording disk, it is required to reduce the vibration of the operating spindle motor which drives the recording disk for rotation. However, reduction in the height of the annular wall on the housing base, as described above, tends to cause reduction in rigidity in supporting the stator, so that it gets difficult to reduce the vibration of the spindle motor.

SUMMARY OF THE INVENTION

It is accordingly an object of the present invention to provide a recording disk drive which contributes to reduction in the vibration of a spindle motor.

According to a first aspect of the present invention, there is provided a recording disk drive comprising: a central axis fixed to a housing base; a rotor mounted around the central axis for relative rotation so as to receive a recording disk; an annular member disposed in a region between the rotor and the central axis so as to be stationary to the central axis; a core body extending in a radial direction from the annular member so as to face the rotor; and a coil wound around the core body so as to provide a stator and fixed to the housing base.

With the above structure, the core body and coil, cantilevered by the annular member, are also supported by the housing base through the coil. Accordingly, the movement of the core body and coil is restrained, so that the stator can be prevented from vibrating during rotation of the rotor. Reduction in the vibration of spindle motor can reliably be achieved.

The number of coils to be fixed to the housing base can be selected depending on the frequency of vibration caused by rotation of the recording disk. Since the frequency of vibration in the stator depends on the number of coils to be fixed to the housing base, the number of coils to be fixed can be selected to vary the frequency of vibration in the stator. If the frequency of vibration in the stator can be shifted out of the frequency of vibration in the rotor, the resonance between the vibrations of the stator and rotor can be prevented. Besides, the frequency of vibration in the stator can be adjusted based on the location of the coil fixed to the housing base.

In fixing the coil to the housing base, a recess may be formed on the housing base so as to extend in a circumferential direction of the recording disk. The recess allows an adhesion poured therein to receive the coil. The adhesion serves to reliably fix the coil to the housing base when hardened. In this case, the frequency of vibration in the stator can be adjusted, not only by selecting the number of coils to be fixed or the location of the coil in the aforementioned manner, but also by varying the extent of the recess. Variation in the extent of the recess allows variation in the contact area between the adhesion and coil, so that the rigidity can be varied in supporting the stator.

In place of the recess, the recording disk drive may comprise a pedestal formed on the housing base so as to provide a receiving surface with an adhesion applied thereto. The receiving surface receives the coil. The adhesion serves to reliably fix the coil to the housing base through the pedestal when hardened. In this case, the frequency of vibration in the stator can be adjusted not only by selecting the number of coils to be fixed or the location of the coil in the aforementioned manner, but also by varying the area of the receiving surface. Variation in the area of the receiving surface allows variation in the contact area between the adhesion and coil, so that the rigidity can be varied in supporting the stator.

According to a second aspect of the present invention, there is provided a recording disk drive comprising: a central axis fixed to a housing base; a rotor mounted around the central axis for relative rotation so as to receive a recording disk; an annular member disposed in a region between the rotor and the central axis so as to be stationary to the central axis; a core body extending in a radial direction from the annular member so as to be supported by the housing base; and a coil wound around the core body so as to provide a stator.

With the above structure, the core body and coil, cantilevered by the annular member, are also supported by the housing base at the tip or free end of the core body. Accordingly, the movement of the core body and coil is likewise restrained, so that the stator can be prevented from vibrating during rotation of the rotor. Reduction in the vibration of spindle motor can reliably be achieved.

In the same manner as the first aspect, the number of core bodies to be supported on the housing base can be selected depending on the frequency of vibration caused by rotation of the recording disk. Since the frequency of vibration in the stator depends on the number of core bodies to be supported on the housing base, the number of core bodies to be supported can be selected to vary the frequency of vibration in the stator. If the frequency of vibration in the stator can be shifted out of the frequency of vibration in the rotor, the resonance between the vibrations of the stator and rotor can be prevented. Otherwise, the frequency of vibration in the stator can be adjusted based on the location of the core bodies supported on the housing base.

In particular, three of the core bodies are preferably supported by the housing base. If three core bodies are supported on the housing base, the annular member can easily be set at an attitude parallel to the housing base.

In supporting the tip end of the core body on the housing base, the recording disk drive may comprise a pedestal formed on the housing base so as to provide a receiving surface with an adhesion applied thereto. The receiving surface receives the core body. The adhesion serves to reliably fix the core body to the housing base through the pedestal when hardened. In this case, the frequency of vibration in the stator can be adjusted not only by selecting the number of core bodies to be supported or the location of the core body in the aforementioned manner, but also by varying the area of the receiving surface. Variation in the area of the receiving surface allows variation in the contact area between the adhesion and core body, so that the rigidity can be varied in supporting the stator.

In place of the pedestal, the recording disk drive may comprise a fixing pin standing on the housing base, and a pin hole formed in the core body so as to receive the fixing pin. When the pin hole receives the fixing pin, the tip end of the cantilevered core body can be supported on the housing base through the fixing pin.

The adhesion employed in the first and second aspects may have an elasticity. The employment of the elastic adhesion serves to damp the vibration in the coil or/and core body, so that it is possible to suppress the amplitude of the vibration in the stator.

A spindle motor comprising the aforementioned central axis, rotor and stator may be employed not only in a recording disk drive such as a hard disk drive unit (HDD), a floppy disk (FD) drive, a compact disk (CD, CD-ROM, CD-R) drive, a digital video disk (DVD) drive, but also in other instruments such as a video cassette recorder (VCR), a voice cassette recorder, or the like. When the spindle motor is assembled in the aforementioned recording disk drive, the recording disk drive preferably comprises an annular wall raised on the housing base around the central axis so as to contact an inner surface of the annular member.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENT

Figure 1:
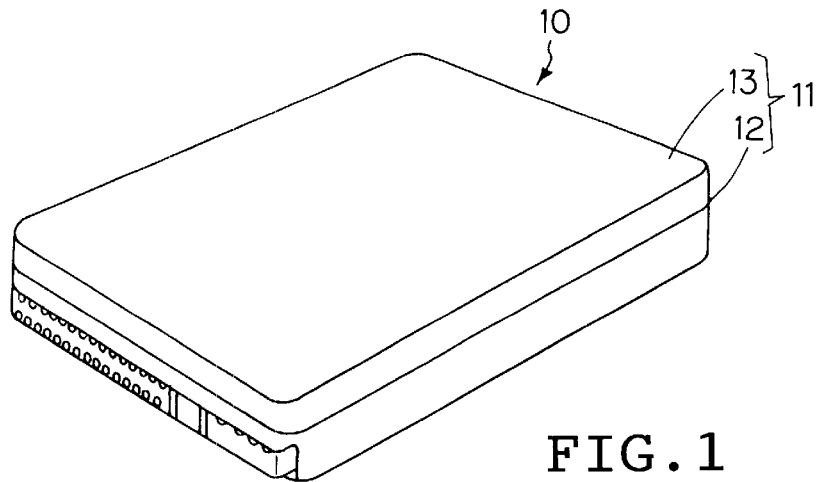
FIG. 1 is a perspective view illustrating the outline of a hard disk drive unit (HDD)

FIG. 1 illustrates a hard disk drive unit (HDD) as an embodiment of a recording disk drive. The HDD 10 comprises a box-shaped housing body 12 and a cover 13 attached to the opening of the housing body 12. The housing body 12 and the cover 13 constitute a closed housing 11 of the HDD 10. The HDD 10 may be assembled in the housing of a computer, or may be utilized as an exterior storage device independent of a computer.

Figure 2:
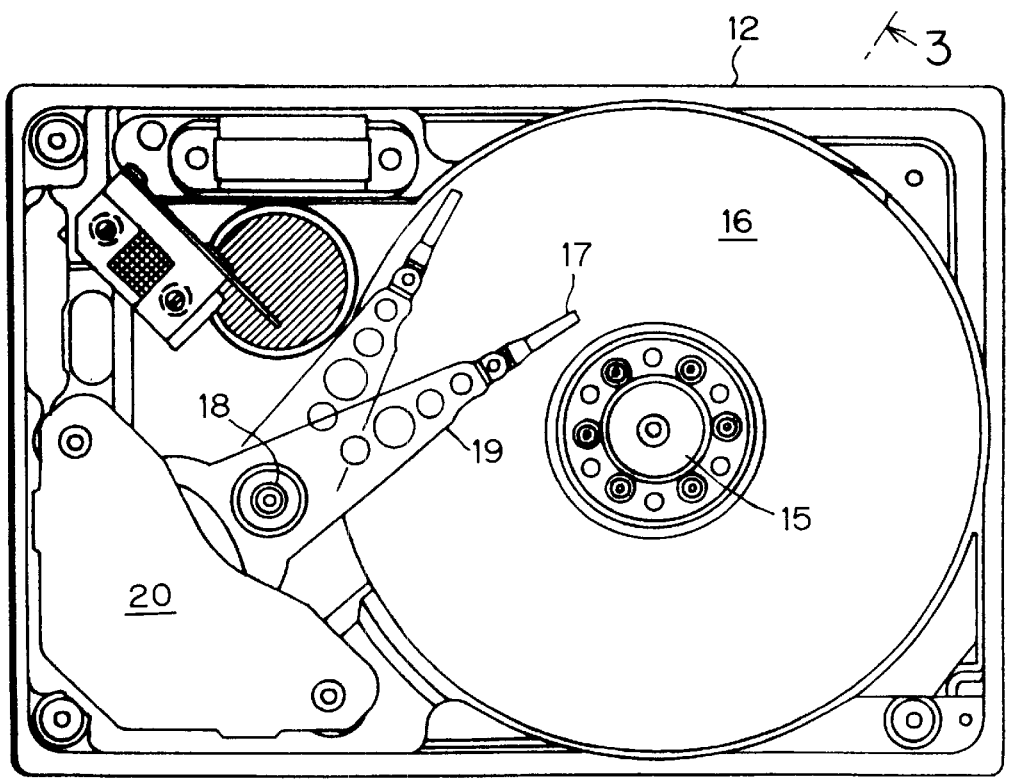
FIG. 2 is a plan view illustrating the inner structure of the HDD.

As shown in FIG. 2, the housing 11 accommodates magnetic disks 16 as a recording disk capable of rotating around a central axis 15 of a spindle motor, which will be described in detail later, and magnetic heads 17 or transducer heads opposed to the respective surfaces of the magnetic disks 16. The magnetic heads 17 are fixed at the tip ends of carriage arms 19 which are capable of swinging around a common support axis 18. When information is read out of or written in the recording disk 16, the carriage arm 19 is driven for swinging movement by an actuator 20 comprising a magnetic circuit, so that the magnetic head 17 is positioned at a target recording track on the surface of the magnetic disk 16.

Figure 3:
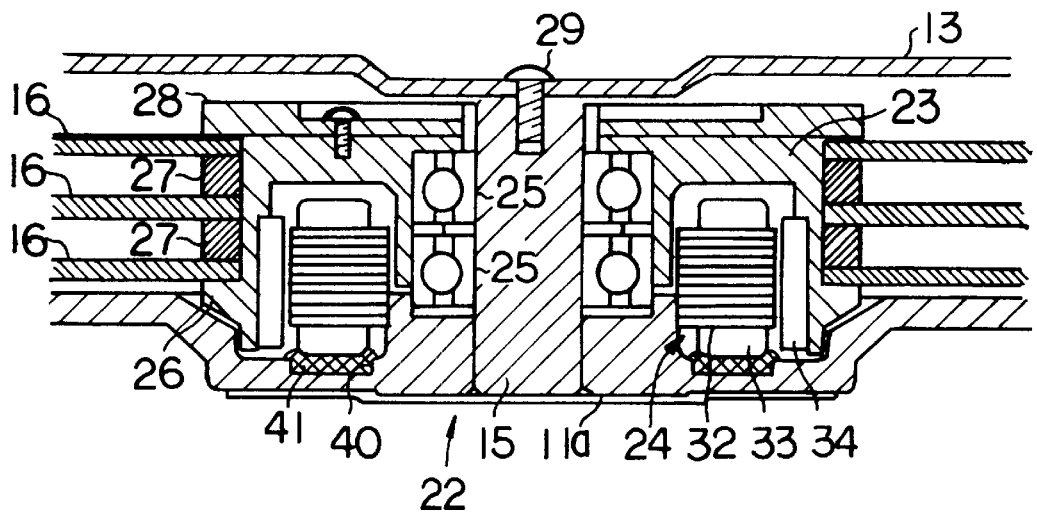
FIG. 3 is a part of an enlarged sectional view taken along the line 3—3 in FIG. 2, illustrating the structure of a spindle motor according to a first embodiment of the present invention.

As is apparent from FIG. 3, a spindle motor 22 according to a first embodiment of the present invention comprises a rotor 23 mounted on the central axis 15 which is fixed at the housing base 11a, and a stator 24 fixed to the housing base 11a. The rotor 23 is supported on the central axis 15 via a pair of ball bearings 25 fixed to the central axis 15 at upper and lower positions, respectively. When the rotor 23 is connected to the central axis 15 in this manner, the stator 24 is accommodated in a space defined between the rotor 23 and the housing base 11a.

The magnetic disks 16 and spacer rings 27 are alternately superposed on an outer flange 26 formed at the lower end of the rotor 23. The spacer rings 27 serve to keep the magnetic disks 16 at constant intervals along the central axis 15. When a clamp 28 is attached to the tip end of the central axis 15, the superposed magnetic disks 16 and spacer rings 27 are reliably fixed between the clamp 28 and the outer flange 27. When the cover 11 is coupled to the housing body 12 after the magnetic disks 16 are mounted on the rotor 23 in this manner, the tip end of the central axis 15 is screwed by a screw 29 to the cover 13.

Figure 4:
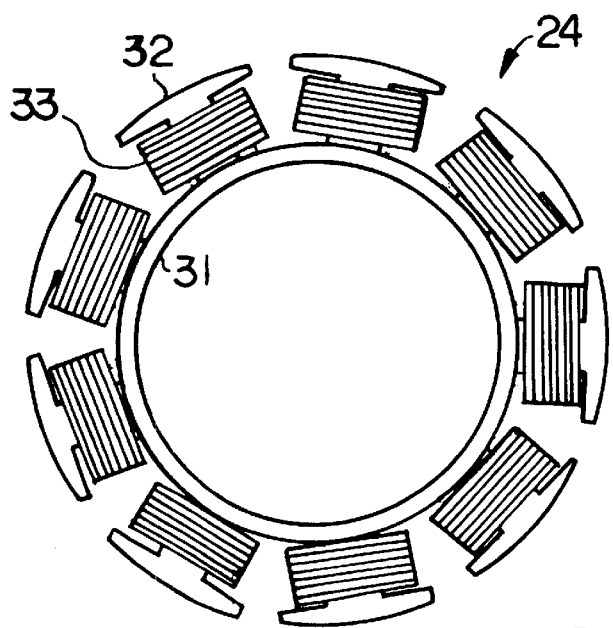
FIG. 4 is a plan view illustrating a stator.

Referring also to FIG. 4, the stator 24 comprises an annular member 31 fixed to the housing base 11a so as to surround the central axis 15. The annular member 31 may be structured by a plurality of layered thin plates. A plurality of core bodies 32 are integrally formed on the annular member 31 so as to extend in the outward radial directions from the central axis 15. Coils 33 are wound around the respective core bodies 32. When the stator 24 is accommodated in the rotor 23, the free or tip ends of the core bodies 32 with the coils 33 are adapted to face a plurality of permanent magnets 34 fixed to the rotor 23.

Figure 5:
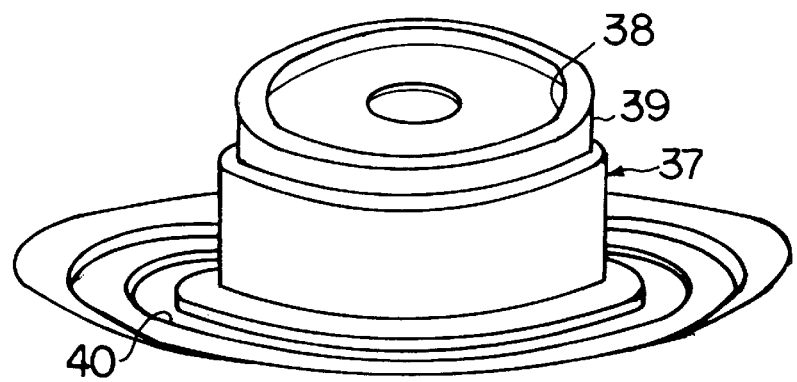
FIG. 5 is an enlarged perspective view illustrating a column on the housing base.

Referring to FIGS. 3 and 5, a support column 37 is formed on the housing base 11a for reinforcing the rigidity in supporting the central axis 15. A depression 38 is formed at the upper end of the support column 37 for accommodating a part of the lower ball bearing 25. An annular step 39 is formed around the outer surface of the upper end of the support column 37 so as to receive the annular member 31. When the annular member 31 is coupled to the annular step 39, the inner surface of the annular member 31 contacts the outer surface of the support column 37, namely, an annular wall. Such contact serves to position or align the core bodies 32 relative to the housing base 11a.

An annular recess 40 is formed on the housing base 11a so as to extend in the circumferential direction of the magnetic disks 16. When an adhesion 41 is poured into the annular recess 40, the exposed surface of the adhesion 41 is adapted to receive the lower ends of the coils 33. The adhesion 41 serves to reliably fix the coil 33 to the housing base 11a when hardened.

Next, the description will be made on assembling the HDD. Prior to assembling, the housing body 12 is for example cast. The support column 37 and annular recess 40 are formed on the housing body 12, as shown in FIG. 5. Fluid adhesion 41 is poured in the annular recess 40 of the cast housing body 12. The poured adhesion 41 preferably swells from the level of the surface of the housing base 11a, out of the annular recess 40.

After pouring the adhesion 41, the assembly of the stator 24 as shown in FIG. 4 is mounted on the support column 37. The annular member 31 may be tightly set around the annular step 39 of the support column 37 in assistant with some pressure. Otherwise, the annular member 37 may be fixed to the support column 37 in different ways. When the annular member 31 has been set on the support column 37 at the annular step 39, the core bodies 32 extending in the radial directions from the annular member 31 can be positioned or aligned at predetermined locations on the housing base 11a.

When the annular member 31 is properly set, the coils 33 are urged against the surface of the adhesion 41 which swells and is exposed out of the annular recess 40. The adhesion 41 is then subjected to hardening, keeping this status. As a result, the stator 24 is fixed to the housing base 11a, not only through the annular member 31, but also through the coils 33 on the adhesion 41.

The central axis 15 is then fixed to the housing base 11a at the center of the support column 37. The support column 37 serves to establish the concentricity between the arrangement of the core bodies 32 and the central axis 15. When the rotor 23 is mounted on the central axis 15, the concentricity is established between the annular arrangements of the core bodies 32 and the permanent magnets 34.

Thereafter, other components such as the magnetic disks 16 are assembled in the housing body 12. When the whole components have been assembled, the cover 13 is coupled to the housing body 12. Finally, the screw 29 is screwed in the upper end of the central axis 15 through the cover 13.

According to the HDD 10 assembled in the above-described manner, the cantilevered core bodies 32 and coils 33 are also supported by the housing base 11a through the coils 33. Accordingly, the movement of the core bodies 32 and coils 33 is restrained, so that the stator 24 is prevented from vibrating during rotation of the rotor 23. Reduction in the vibration of the spindle motor 22 can be achieved.

When an electric current is supplied to the coils 33, the magnetic field induced in the coils 33 serves to drive the rotor 23 for rotation. In this condition, some factors such as the eccentricity of the ball bearings 25 or the magnetic disks 16 may generate the vibration in the rotating rotor 23. If such vibration happens to resonate with the vibration of the stator 24, the vibration may be amplified in the rotating magnetic disks 16.

According to the spindle motor 22 of this embodiment, the degree of rigidity in supporting the stator 24 can be adjusted by varying the number of the coils 33 to be fixed to the housing base 11a. Variation in the degree of rigidity is supposed to vary the frequency of vibration in the stator 24. Accordingly, the number of the coils 33 to be fixed to the housing base 11a may be determined to set the frequency of vibration in the stator 24 at a desired level. If the frequency of vibration in the stator 24 can be shifted from the frequency of vibration in the rotor 23 in this manner, the resonance between the vibrations of the stator 24 and the rotor 23 can be intentionally prevented.

Otherwise, the degree of rigidity in supporting the stator 24 may be adjusted by the contact area between the coils 33 and the adhesion 41. For example, if the extent or/and width of the annular recess 41 is varied to change the area of the exposed surface of the adhesion out of the annular recess 41, the contact area can be varied between the coils 33 and the adhesion 41. The adjustment in the contact area in this manner enables the selection of the frequency of vibration in the stator 24.

In this embodiment, the annular recess 40 may be replaced with a recess or recesses of other shapes. The location of the annular recess 40 may be shifted in accordance with the positions of the coils 33 to be fixed to the housing base 11a. Adjustment of the location for the coils 33 to be fixed to the housing base 11a enables the selection of the frequency of vibration in the stator 24.

Figure 7:
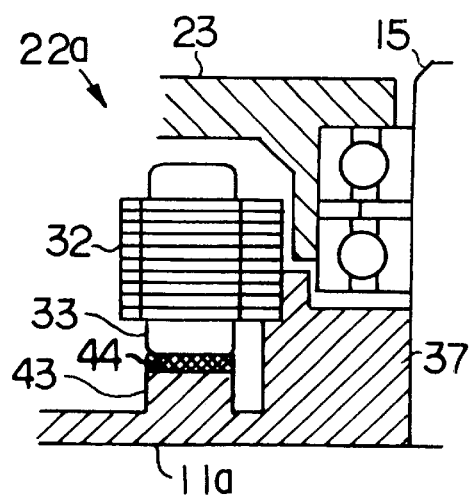
FIG. 7 is an enlarged sectional view illustrating a part of the spindle motor according to a second embodiment of the present invention.
Figure 6:
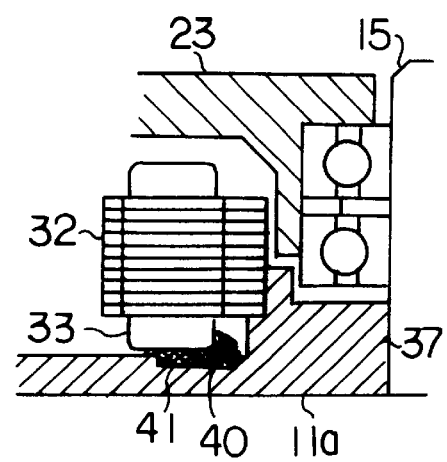
FIG. 6 is an enlarged sectional view illustrating a part of the spindle motor according to the first embodiment when the width of the recess is varied.

FIG. 7 illustrates a part of a spindle motor 22a according to a second embodiment of the present invention. The spindle motor 22a of this embodiment allows the coil 33 or coils 33 to be supported on a pedestal or pedestals 43 formed on the housing base 11a, in place of the aforementioned annular recess 40. The pedestal 43 is adapted to receive the coil 33 at a receiving surface 44. The adhesion 41 is applied to the receiving surface 44. The adhesion 41 serves to reliably fix the coil 33 to the housing base 11a when hardened. The identical reference numerals are fixed to the structure or/and components achieving the same function as those in the above-described first embodiment so as to omit the duplicate description.

According to the spindle motor 22a of this embodiment, in the same manner as the spindle motor 22 of the first embodiment, the cantilevered core bodies 32 and coils 33 are also supported by the housing base 11a. Accordingly, the movement of the core bodies 32 and coils 33 is restrained, so that the stator 24 is prevented from vibrating during rotation of the rotor 23. Reduction in the vibration of the spindle motor 22a can be achieved. In addition, the size of the receiving surface 44 can be varied to select the frequency of vibration in the stator 24, or the number of the pedestals 43 can be selected to determine the frequency of vibration in the stator 24, in the same manner as the first embodiment.

The number of pedestals 43 need not correspond to the number of the coils 33. If the frequency of vibration in the stator 24 can be shifted from the frequency of vibration in the rotor 23 in this manner, the resonance between the vibrations of the stator 24 and the rotor 23 can be intentionally prevented.

Figure 8:
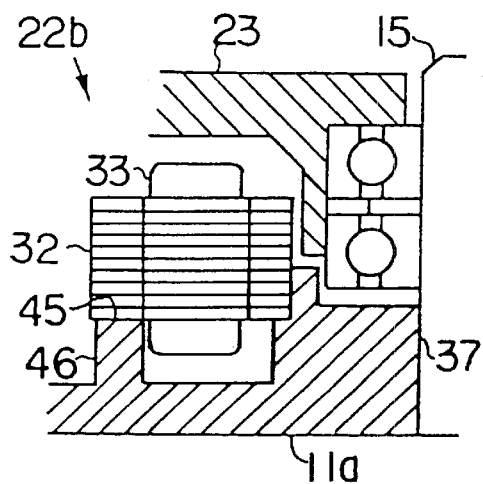
FIG. 8 is an enlarged sectional view illustrating a part of the spindle motor according to a third embodiment of the present invention.

FIG. 8 illustrates a part of a spindle motor 22b according to a third embodiment of the present invention. The spindle motor 22b of this embodiment allows the tip or free end or ends of the core body or bodies 32 to be supported by the housing base 11a. A pedestal 46 may be formed on the housing base 11a so as to receive the tip end of the core body 32 at a receiving surface 45. The identical reference numerals are fixed to the structure or/and components achieving the same function as those in the above-described first embodiment so as to omit the duplicate description.

According to the spindle motor 22b of this embodiment, the core body 32 and coil 33, cantilevered by the annular member 31 fixed on the support column 37, are also supported by the pedestal 46 at the tip end of the core body 32. Accordingly, the movement of the core body 32 and coil 33 is restrained, so that the stator 24 is prevented from vibrating during rotation of the rotor 23. Reduction in the vibration of the spindle motor 22b can be achieved. The core body 32 may be fixed to the receiving surface 45 of the pedestal 46 by an adhesion.

Also in this embodiment, the size of the receiving surface 45 can likewise be varied to change the frequency of vibration in the stator 24, or the number of the pedestals 46 can likewise be selected to determine the frequency of vibration in the stator 24. The number of pedestals 46 need not correspond to the number of core bodies 32. If the frequency of vibration in the stator 24 can be shifted from the frequency of vibration in the rotor 23 in this manner, the resonance between the vibrations of the stator 24 and the rotor 23 can be intentionally prevented.

Figure 9:
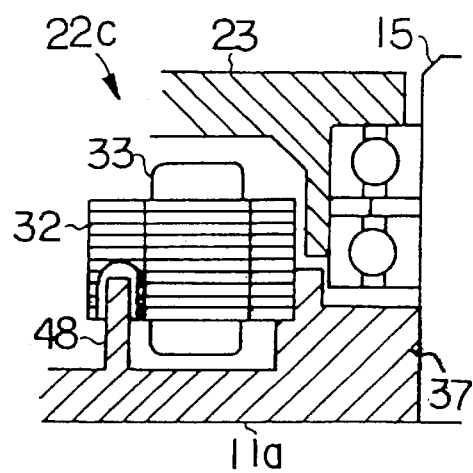
FIG. 9 is an enlarged sectional view illustrating a part of the spindle motor according to a fourth embodiment of the present invention.
Figure 10:
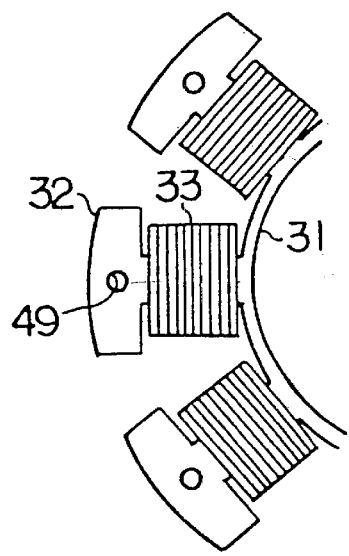
FIG. 10 is a partial plan view illustrating the tip end of the core body in the annular member.

FIG. 9 illustrates a part of a spindle motor 22c according to a fourth embodiment of the present invention. The spindle motor 22c of this embodiment allows the tip or free end or ends of the core bodies 32 to be supported by a fixing pin 48 standing on the housing base 11a. A pin hole 49 may be formed in the core body 32 so as to receive the fixing pin 48 as shown in FIG. 10. The identical reference numerals are fixed to the structure or/and components achieving the same function as those in the first, second or third embodiment so as to omit the duplicate description.

According to the spindle motor 22c of this embodiment, the core body 32 and coil 33, cantilevered by the annular member 31 fixed on the support column 37, are also supported by the fixing pin 48 at the tip end of the core body 32. Accordingly, the movement of the core body 32 and coil 33 is restrained, so that the stator 24 is prevented from vibrating during rotation of the rotor 23. Reduction in the vibration of the spindle motor 22c can be achieved. In addition, the number of the fixing pins 48 can likewise be selected to determine the frequency of vibration in the stator 24. The number of fixing pins 48 need not correspond to the number of the core bodies 32. If the frequency of vibration in the stator 24 can be shifted from the frequency of vibration in the rotor 23 in this manner, the resonance between the vibrations of the stator 24 and the rotor 23 can be intentionally prevented.

The aforementioned spindle motors 22, 22a, 22b, 22c may employ the adhesion 41 having an elasticity for fixing the coil 33 or/and core body 32 to the annular recess 40 or/and the pedestals 43, 46. The employment of the elastic adhesion enables the damping of the vibration in the coil 33 and/or core body 32, so that it is possible to suppress the amplitude of the vibration in the stator 24.

What is claimed is:

1. A recording disk drive comprising:
    a central axis fixed to a housing base;
    a rotor mounted around the central axis for relative rotation so as to receive a recording disk;
    an annular member disposed in a region between the rotor and the central axis so as to be stationary to the central axis;
    first and second core bodies each extending in a radial direction from the annular member so as to face the rotor;
    a first coil wound around the first core body so as to provide a stator and fixed to the housing base; and
    a second coil wound around the second core body so as to provide a stator and not fixed to the housing base.

2. The recording disk drive according to claim 1, wherein a recess is formed on the housing base so as to extend in a circumferential direction of the recording disk, said recess allowing an adhesion poured therein to receive the first coil.

3. The recording disk drive according to claim 2, wherein said adhesion has an elasticity.

4. The recording disk drive according to claim 1, further comprising an annular wall raised on the housing base around the central axis so as to contact an inner surface of the annular member.

5. A recording disk drive comprising:
    a central axis fixed to a housing base;
    a rotor mounted around the central axis for relative rotation so as to receive a recording disk;
    an annular member disposed in a region between the rotor and the central axis so as to be stationary to the central axis;
    a core body extending in a radial direction from the annular member so as to face the rotor;
    a coil wound around the core body so as to provide a stator; and
    a pedestal formed on the housing base so as to provide a receiving surface with an adhesion applied thereto, said receiving surface receiving the coil.

6. The recording disk drive according to claim 5, wherein said adhesion has an elasticity.

7. A recording disk drive comprising:
    a central axis fixed to a housing base;
    a rotor mounted around the central axis for relative rotation so as to receive a recording disk;
    an annular member disposed in a region between the rotor and the central axis so as to be stationary to the central axis;
    a first core body extending outwardly in a radial direction from the annular member, said first core body supported by the housing base near an outer end;
    a second core body extending outwardly in a radial direction from the annular member, said second core body supported by the housing base only via said annular member; and
    coils wound around the first and second core bodies, respectively so as to provide stators.

8. The recording disk drive according to claim 7, further comprising at least one additional core body that is supported by the housing base near an outer end.

9. The recording disk drive according to claim 8, wherein two additional core bodies are supported by the housing base near an outer end.

10. The recording disk drive according to claim 7, further comprising a pedestal formed on the housing base so as to provide a receiving surface with an adhesion applied thereto, said receiving surface receiving the first core body.

11. The recording disk drive according to claim 10, wherein said adhesion has an elasticity.

12. The recording disk drive according to claim 8, further comprising a fixing pin standing on the housing base, and a pin hole formed in the first core body so as to receive the fixing pin.

13. The recording disk drive according to claim 8, further comprising an annular wall raised on the housing base around the central axis so as to contact an inner surface of the annular member.

14. A spindle motor comprising:

a central axis fixed to a housing base;

a rotor mounted around the central axis for relative rotation;

an annular member disposed in a region between the rotor and the central axis so as to be stationary to the central axis;

a core body extending in a radial direction from the annular member so as to face the rotor; and a coil wound around the core body so as to provide a stator and fixed to a receiving surface defined on a pedestal formed on the housing base.

15. The spindle motor according to claim 14, wherein an adhesion is applied to the receiving surface so as to receive the coil.

16. The spindle motor according to claim 15, wherein said adhesion has an elasticity.

17. A spindle motor comprising:

a central axis fixed to a housing base;

a rotor mounted around the central axis for relative rotation;

an annular member disposed in a region between the rotor and the central axis so as to be stationary to the central axis;

a first core body extending outwardly in a radial direction from the annular member, said first core body supported by the housing base near an outer end;

a second core body extending outwardly in a radial direction from the annular member, said second core body supported by the housing base only via said annular member; and coils wound around the first and second core bodies, respectively so as to provide stators.

* * * * *

UNITED STATES PATENT AND TRADEMARK OFFICE
CERTIFICATE OF CORRECTION

PATENT NO. : 6,407,882 B1 Page 1 of 1
APPLICATION NO. : 09/301003
DATED : June 18, 2002
INVENTOR(S) : Katahara et al.

It is certified that error appears in the above-identified patent and that said Letters Patent is hereby corrected as shown below:

<u>In the Claims</u>:

Column 9, Line 7, please delete "claim 8" and insert --claim 7--

Column 9, Line 11, please delete "claim 8" and insert --claim 7--

Signed and Sealed this

Seventeenth Day of July, 2007

JON W. DUDAS
*Director of the United States Patent and Trademark Office*